United States Patent
Barnhart et al.

(10) Patent No.: US 6,298,220 B1
(45) Date of Patent: Oct. 2, 2001

(54) POWER CONTROL SYSTEM FOR COMMUNICATIONS CHANNELS

(75) Inventors: Andrew W. Barnhart, Gaithersburg, MD (US); Michael Parr, Hermosa Beach, CA (US); Neville Mathews, Rockville, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/231,071

(22) Filed: Jan. 14, 1999

Related U.S. Application Data (60) Provisional application No. 60/071,558, filed on Jan. 15, 1998.

(51) Int. Cl.[7] .................................................. H04B 1/00
(52) U.S. Cl. .......................... 455/69; 455/522; 455/13.4
(58) Field of Search ........................... 455/69, 522, 115, 455/10, 70, 507, 517, 68, 427, 13.4, 500; 370/318; 375/211, 358

(56) References Cited

U.S. PATENT DOCUMENTS

| | | | |
|---|---|---|---|
| 4,777,653 | * | 10/1988 | Bonnerot et al. ...................... 455/69 |
| 5,487,180 | * | 1/1996 | Ohtake ................................ 455/522 |
| 5,887,245 | * | 3/1999 | Lindroth et al. ........................ 455/69 |
| 5,926,747 | * | 7/1999 | Komara et al. ......................... 455/69 |
| 5,982,760 | * | 11/1999 | Chen .................................... 370/335 |
| 5,987,333 | * | 11/1999 | Sole .................................... 455/522 |

* cited by examiner

*Primary Examiner*—Nay Maung
*Assistant Examiner*—Sonny Trinh
(74) *Attorney, Agent, or Firm*—John T. Whelan; Michael W. Sales

(57) ABSTRACT

A system for controlling/conserving signal transmission power in a communications system is disclosed. The system generally includes a first unit having a transmitter and a receiver, a second unit having a transmitter and a receiver, a forward communications channel between the first unit transmitter and the second unit receiver, and a reverse communications channel between the second unit transmitter and the first unit receiver. In operation, the system determines the received signal power needs of the second unit receiver. It then generates a reverse channel explicit-power-request command based on the determination of the received signal power needs of the second unit receiver. The reverse channel explicit-power-request command represents an absolute power level at which the first unit transmitter should transmit signals over the forward communications channel. In general, this reverse channel explicit-power-request command communicates the absolute power level in a manner that is independent of the power level at which the first unit transmitter had previously been transmitting with. The system also generates a forward channel explicit-power-notification message based on a determination of the transmitted signal power from the first unit transmitter. The forward channel explicit-power-notification message represents an absolute power level at which the first unit transmitter is transmitting signals over the forward communications channel.

31 Claims, 3 Drawing Sheets

POWER CONTROL SYSTEM FOR COMMUNICATIONS CHANNELS

This is a continuation of pending U.S. provisional patent application Serial No. 60/071,558, filed Jan. 15, 1998.

BACKGROUND OF THE INVENTION (a) Field of the Invention

The present invention relates in general to satellite and terrestrial radio communications channels. More particularly, it relates to an improved system of conserving transmission power over satellite and terrestrial radio communications channels, while maintaining an acceptable signal quality level.

(b) Description of Related Art

For both communications satellites and terrestrial radio, there is often the need to conserve the transmitted power of signals sent over the communications channels, on both an individual and a collective basis. However, this need to conserve transmitted power must be balanced by a conflicting need to maintain an acceptable signal quality, often in the presence of variable radio propagation conditions. The transmitted signals may represent voice, data and/or video.

Conserving signal transmission power in a communications system calls for an adaptive method of regulating the transmit power of each individual communications channel based on the received signal quality at the signal's destination. In general, a power control/conservation system should be responsive to rapidly varying propagation conditions, exhibit dynamic stability and effective transient response of the regulatory process, maintain an acceptable or desired signal quality, and deliver significant power savings even in adverse propagation environments.

The present invention is a power conservation/control system that achieves the aforementioned and other goals.

SUMMARY OF THE INVENTION

The present invention addresses the aforementioned goals in a system for controlling/conserving signal transmission power in a communications system. The system generally includes a first unit having a transmitter and a receiver, a second unit having a transmitter and a receiver, a forward communications channel between the first unit transmitter and the second unit receiver, and a reverse communications channel between the second unit transmitter and the first unit receiver. In operation, the system determines the received signal power needs of the second unit receiver. It then generates a reverse channel explicit-power-request (EPR) command based on a determination of the received signal power needs of the second unit receiver. The reverse channel EPR command represents an absolute power level at which the first unit transmitter should transmit signals over the forward communications channel. In general, this reverse channel explicit-power-request command communicates the absolute power level in a manner that is independent of the power level at which the first unit transmitter had previously been transmitting with. The system also generates a forward channel explicit-power-notification (EPN) message based on a determination of the transmitted signal power from the first unit transmitter. The forward channel explicit-power-notification message represents an absolute power level at which the first unit transmitter is transmitting signals over the forward communications channel.

The invention itself, together with further objects and attendant advantages, will best be understood by reference to the following detailed description, taken in conjunction with the accompanying drawings.

DESCRIPTION OF THE PREFERRED EMBODIMENTS

By way of example only, the method and apparatus of the present invention will be described below in connection with a particular system illustrated in FIGS. 1 and 5. However, as will be appreciated by a person of ordinary skill in the relevant art(s), the power control/conservation methods described herein and embodying the present invention have application to many different wireless/radio applications beyond the example illustrated and described in this specification.

The specific power regulation needs of a given system depend on the specific technology involved. These include, but are not limited to, the following. For transmissions from a user terminal: minimize user terminal battery power drain by using a transmission power which meets the minimum signal quality requirements of the channel in use; reduce channel interference at a relay (e.g., a satellite) by ensuring that all transmitted signals are received at approximately the same level; and reduce channel interference at a gateway of the system by ensuring that all signals are received at approximately the same level. For transmissions to a user terminal: save overall satellite power by transmitting at a power level just sufficient to combat the actual level of fading being experienced to each user terminal, rather than employing a constant power level that corresponds to the requirements of the worst case link; and reduce channel interference for those user terminals in neighboring spot-beams/cells/sectors, especially when frequency re-use plans are in effect.

To meet these needs, a key function of a power control/conservation system would be to ensure that the radio receivers operate with an adequate link margin but not an excessive margin. For these conflicting requirements, maintaining signal quality is generally given priority. In realizing these objectives, the power control means must adapt to changing path loss conditions, such as shadowing and multipath conditions. Also, a prompt corrective response is required for a sudden, sustained increase in path loss, such as might be incurred by an abrupt signal shadowing event. It is additionally desirable that this response should neither overshoot the power value that is desired nor be slow to reach this desired value ("undershoot").

Figure 1:
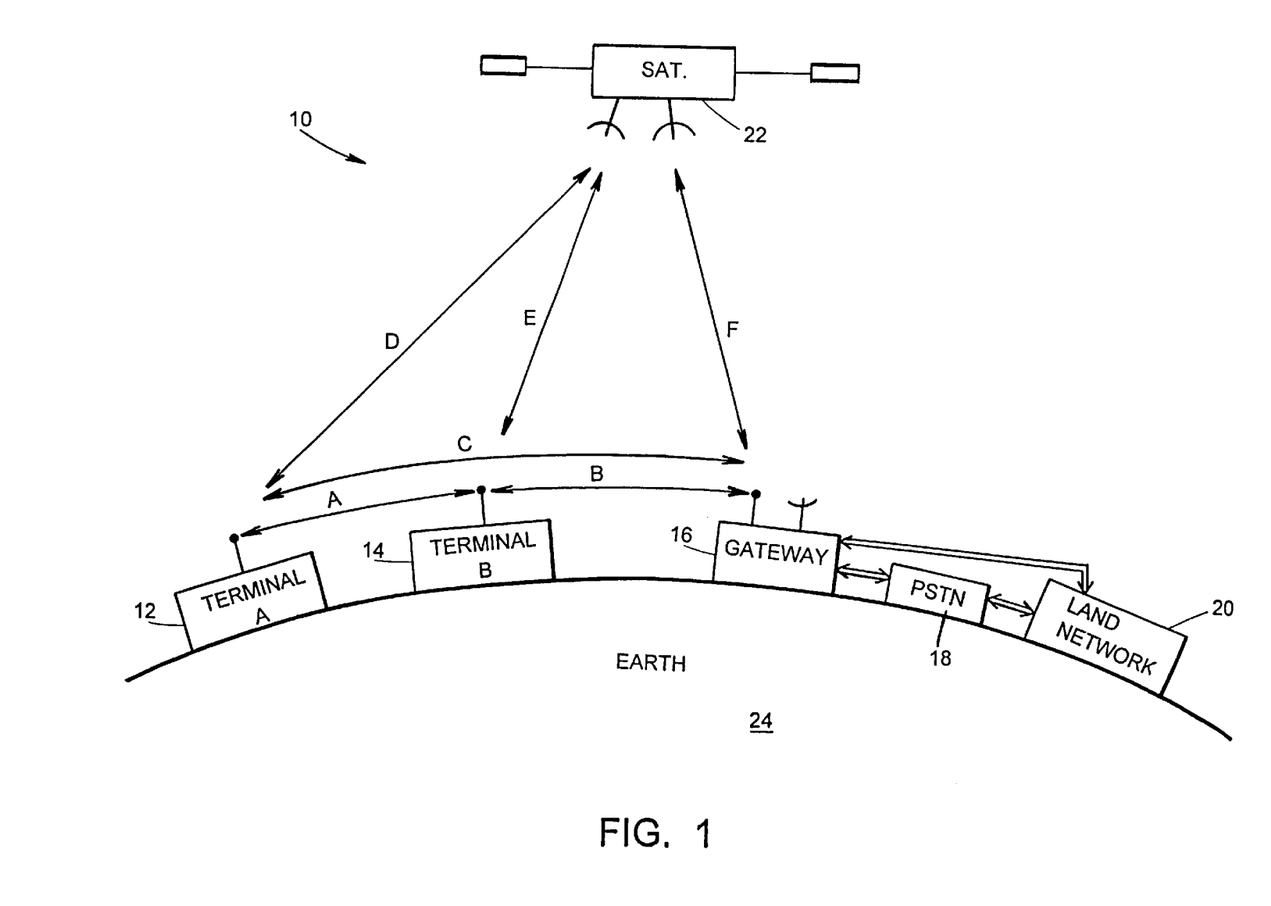
FIG. 1 is a diagram illustrating a communications system capable of utilizing the power control system of the present invention.

FIG. 1 illustrates a communications system 10 capable of utilizing the power control/conservation features of the present invention. The system 10 includes a terminal-A 12, a terminal-B 14, a gateway 16, access to the public switched telephone network (PSTN) 18, access to a land network 20, and a satellite 22. Communications may take place between terminal-A 12 and terminal-B 14 (path A), between terminal-B and the gateway 16 (path B), between terminal-A and the gateway 16 (path C), between terminal-A and the satellite 22 (path D), between terminal-B and the satellite 22 (path E), between the gateway 16 and the satellite 22 (path F), from terminal-A 12 to the satellite 22 to terminal-B and vice versa (paths D & E), from terminal-A 12 to the gateway 16 to terminal-B and vice versa (paths C & B), from terminal-A 12 to the satellite 22 to the gateway 16 and vice versa (path D, F & C), from terminal-B 14 to the satellite 22 to the gateway 16 and vice versa (path E, F & B), and from terminal-A to the satellite 22 to the gateway 16 to the satellite 22 to terminal-B and vice versa (paths D, F, F & E). Other pathways not listed above are also possible depending upon the particular application and the particular communications system configuration.

The terminals (A & B) may be hand-held units that are portable, connected with a moving vehicle, or at a fixed location. When active, the terminal employs at least one radio channel, and it may employ additional channel(s) for diversity means. The gateway 16 serves multiple user terminals. It may connect a user with another user supported by the gateway 16, a service supplied at the gateway 16, or access to terrestrial networks (e.g., PSTN 18, land network 20, etc.) to which the gateway 16 is attached. Depending on the applicable industry, a gateway 16 may have radio links directed to the user terminals 12, 14, as with cellular radio, or may have radio links to the satellite 22.

The term round-trip-time (RTT) is used herein to refer to the total time, including propagation, processing, and messaging delays, for a received variation in signal quality to be corrected by closed-loop means. The signal quality measure (SQM) is a known parameter that provides a measure of the quality of the received signal. For the purposes of this invention, the SQM may represent any measure of the received power level, the received signal-to-noise ratio, the received signal-to-noise-plus interference ratio, $$\left(\frac{S}{(N+I)}\right)$$

or any other such measure.

In the cases of terminal 12, 14 to gateway 16 communications, the purpose of the communication may be either for services that are directly provided by the gateway 16, or the gateway 16 may be providing access to terrestrial networks or even other gateways. In some cases the gateway 16 will be used to perform the initial radio resource allocations. For example, terminal-A contacts the gateway 16, requesting to contact terminal-B. The gateway 16 contacts terminal-B, and upon terminal-B's acceptance of the call, the gateway 16 allocates and assigns radio resources for the direct terminal-A to terminal-B communications. Also, there is the configuration wherein the gateway 16 may wish to monitor this direct terminal-A to terminal-B communication. The present invention may be applied separately to the "forward" direction (e.g. gateway 16 transmitting to a terminal (A or B) or the "reverse" direction (e.g. a terminal (A or B) transmitting to gateway 16), or simultaneously to both directions of transmission.

Figure 4:
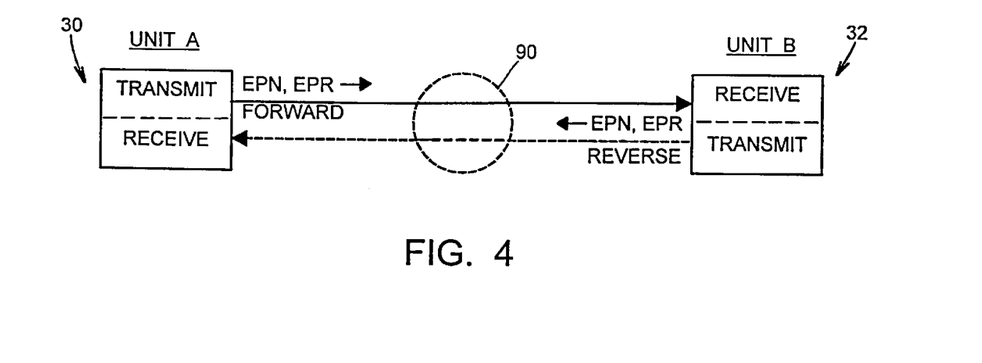
FIG. 4 is a diagram still further illustrating the communication between a first unit and a second unit of the communications system shown in FIG. 1. In accordance with the present invention, explicit-power-request (EPR) commands are generated at each of the units and transmitted over one of the communications channels, and explicit-power-notification (EPN) messages are generated at each of the units and transmitted over one of the communications channels.
Figure 5:
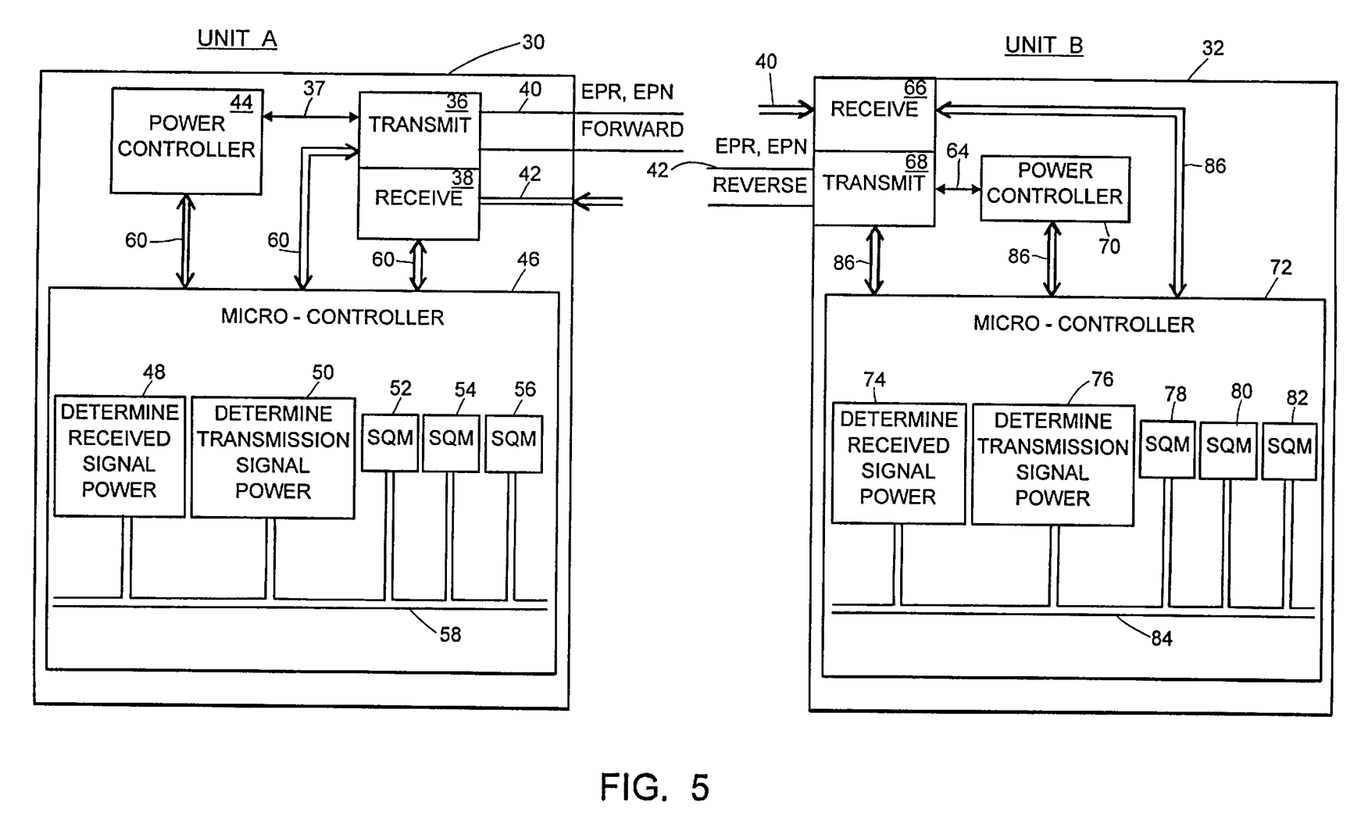
FIG. 5 is a diagram illustrating further details of the units shown in FIGS. 2–4.

FIG. 5 is a diagram illustrating additional details of selected portions of the power control/conservation system shown in FIG. 1 and embodying the present invention. The units 30, 32 illustrated in FIG. 5 (as well as FIGS. 2–4) represent any of the communication elements of the system 10 (e.g., terminal-A 12, terminal-B 14, gateway 16, satellite 22, etc.) shown in FIG. 1. Unit-A 30 includes a transmitter 36, a receiver, 38, a power controller 44, and a micro-controller 46. The micro-controller 46 is programmed to perform a variety of functions in connection with the present invention, including determining received signal power 48, determining transmitted signal power 50, determining a signal quality measurement (SQM) 52, determining an explicit-power-request (EPR) 54 and determining an explicit-power-notification (EPN) 56. The various functional blocks (48, 50,52,54 & 56) communicate with one another in a conventional manner, for example via a bus-type communication path 58. These functional blocks also communicate with other elements of Unit-A 30 (e.g., power controller 44, transmitter 36 and receiver 38) in a conventional manner, for example via a bus-type communication path 60. Additionally, the power controller 44 controls the transmit power of transmitter 36 via a control path 37. The micro-controller 46 includes a number of other conventional elements (e.g. memory) that are found in a conventional programmable micro-controller/processor.

Unit-B 32, like Unit-A 30 includes a receiver 66, a transmitter 68, a power controller 70, and a micro-controller 72. The micro-controller 72 is programmed to perform a variety of functions in connection with the present invention, including determining received signal power 74, determining transmitted signal power 76, determining a signal quality measurement (SQM) 78, determining an explicit-power-request (EPR) 80 and determining an explicit-power-notification (EPN) 82. The various functional blocks (74, 76, 78, 80 & 82) communicate with one another in a conventional manner, for example via a bus-type communication path 84. These functional blocks also communicate with other elements of Unit-B 32 (e.g., power controller 70, transmitter 68 and receiver 66) in a conventional manner, for example via a bus-type communication path 86. Additionally, the power controller 70 controls the transmit power of transmitter 68 via a control path 64. The micro-controller 72 includes a number of other conventional elements (e.g. memory) that are not illustrated but are found in conventional programmable micro-controller/processors.

There is considerable flexibility for design implementation of the controller functions. In controlling the transmit power of Unit A/B, a preferred embodiment of the design of Unit A/B is for the power controller 44/70 to employ a digital to analog converter (DAC), the transmitter 36/68 to employ a voltage-variable amplifier/attenuator (VVA), and the controlling path 38/64 to convey a controlling voltage from the power controller 44/70 to the transmitter 36/68. In operation, the micro-controller 46/72 commands the power controller via the bus 60/86 to produce a control voltage on said path that results in said VVA to produce a gain or attenuation so as to cause the desired change, if any, in the transmit output power of the transmitter 36/68. Such designs are well known to the art.

In addition, for example, some or all of the functions of the micro controller 46/72 may be implemented with a general-purpose microprocessor, a microprocessor of the digital signal processor (DSP) type and/or an application-specific integrated circuit (ASIC). The functions of the receiver 38/66 include demodulation of the incoming signal. A preferred embodiment is to employ a DSP for demodulation. In such case, a preferred embodiment of this invention is to have the DSP of the receiver 38/66 also calculate the SQM 52/78 and furnish this value to the micro controller 46/71 via the bus 60/86.

Figure 2:
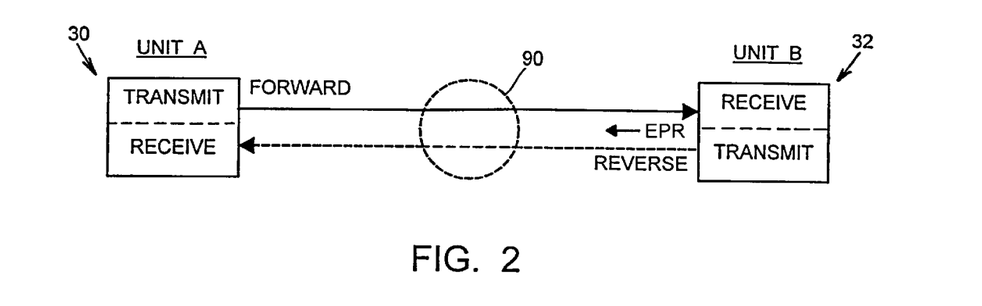
FIG. 2 is a diagram illustrating the communication between a first unit and a second unit of the communications system shown in FIG. 1. In accordance with the present invention, explicit-power-request (EPR) commands are generated at one of the units and transmitted to the other unit over one of the communications channels.
Figure 3:
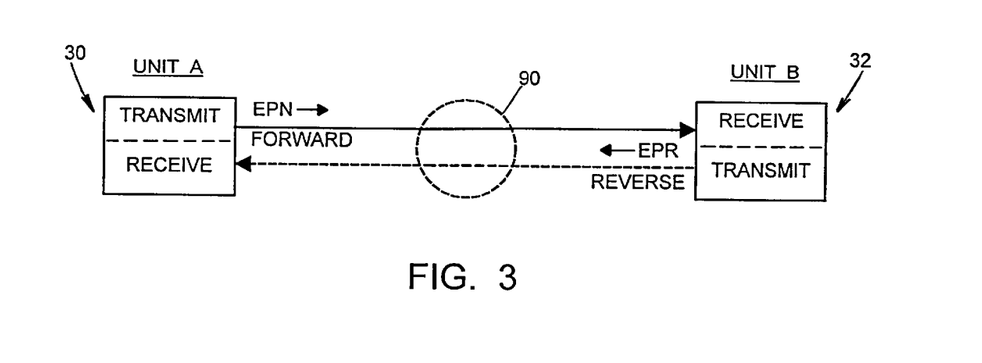
FIG. 3 is a diagram further illustrating the communication between a first unit and a second unit of the communications system shown in FIG. 1. In accordance with the present invention, explicit-power-request (EPR) commands are generated at one of the units and transmitted to the other unit over one of the communications channels, and explicit-power-notification (EPN) messages are generated at one of the units and transmitted to the other unit over one of the communications channels.

Turning now to FIGS. 2–4, a detailed explanation of the operation of the invention will now be provided. The EPR is explained with respect to FIG. 2, which represents a basic power control loop. Unit A is one end of the power control loop, and Unit B is the other end of the loop. Either unit may be a terminal, a gateway, or other radio communication device. Unit A transmits communication signals on a radio channel, designated as "forward", to Unit B's receiver. As illustrated by the dashed circle 90, this channel may go through an intervening device, such as a satellite, and/or incur variations in signal attenuation due to radio propagation impairments.

It is desirable to control the transmit power of Unit A so that just a enough power is used for the quality of the signal received by Unit B to be acceptable. For this purpose, it is assumed that there exists a medium for Unit B to transmit its needs back to Unit A. This medium may, but not necessarily, be another radio channel, which is labeled in FIGS. 2–4 as "reverse". In accordance with the present invention, when a power change is required, then the transmitter of Unit A will be sent an instruction or message to change its transmit power. This instruction or message commands (or requests) the transmitter of Unit A to transmit an absolute power level on the forward channel, with such instruction or message being designated herein as an Explicit Power Request (EPR). Unit A's transmitter will then transmit with the specific power indicated by this EPR, generally independent of the power the transmitter had been previously been transmitting with.

The EPR may be generated using any of various coding formats as may be convenient for the specific embodiment or the technology involved. However, such formats must represent and either directly or indirectly imply a specific power level. For example, the coded EPR may imply direct Power in Watts or milliwatts, direct Power in decibel notation, dBm, dBW, etc., decibels, or other power ratio, with respect to an absolute power reference.

Several advantages of the EPR command can be observed. With the EPR command, sending multiple EPR messages having the same value will produce the same transmission power result for Unit A. This property allows the use of redundant message transmission, which is very useful if there is some chance that the power change messages might get lost or corrupted. It is also observed that if the reverse means is also a radio channel, the EPR command may also be employed by Unit A to control the transmit level of Unit B in a like manner.

FIG. 3 illustrates the use of the explicit power notification (EPN) message feature of the present invention. It may be used with standard power control devices, or in combination with other aspects of this invention described in this specification. The EPN message is the notification by the radio transmitter to the radio channel receiver of the power that the transmitter is transmitting with. A preferred embodiment of this EPN message is to suitably encode the EPN value into a message that is sent within this radio channel to the radio receiver. This EPN may be sent only on power changes, may be sent multiply, or may be sent at various intervals, as required by system performance goals.

For example, with reference to FIG. 3, assume that a request to change a particular power level has been delivered to Unit A. Unit A then changes its power to this particular level, and sends the value of this particular level in a EPN message to Unit B. Unit B may know or remember what power it has requested of Unit A, but Unit B's knowledge of Unit A's actual transmission level at some particular time may be made uncertain by any of several possible influences, including uncertainty in the success of message transmission, uncertainty of the message RTT for the closed loop, or Unit A's delay in, or inability to, change to the power requested. Any such uncertainty can lead to error in Unit B formulating its next power change request. Using the EPN message of the present invention, Unit B will have direct knowledge of the power that Unit A is transmitting with, thereby eliminating such uncertainties, and allowing Unit B to better formulate its power requests. A preferred formulation of this power request is to also employ the EPR means described above. A further description of this combined means is described later in this specification.

The EPN message, when employed for the transmit side of some particular radio channel, may be used in conjunction with a means whereby the transmit power change for said channel, whose power level is commensurate with the value represented by EPN, is also made at such a time that is commensurate to the message period into which said EPN is placed. Furthermore, the loop end (Unit) receiving this channel may determine an SQM for said message period, such SQM being a result of the particular power level for which the message period was sent, and such power level may be identified by the EPN used in the message period. Thus, the difference between the EPN and the SQM, thus synchronized, is a direct measure of the channel loss, and said measure may be used to formulate an appropriate power change, if required. This synchronized EPN means is an optional means that may be employed wherever the regular EPN message is used.

FIG. 3 also illustrates a "combined EPR/EPN means" wherein the power control loop employs both the EPR command and the EPN message for at least one direction of the loop. This combined means equally applies to the situation where the roles of Unit A and Unit B are reversed. A power control end, such as Unit B, based upon its recovery of the received EPN and its determination of the received SQM, may revise its appraisal of the power that the opposite end should be transmitting with, and convey this revised appraisal by means of a EPR to the other end.

With reference to FIG. 3, the operation of a preferred embodiment of the combined EPR/EPN is further illustrated by the following steps:

1. Unit A is transmits on the forward channel with some specific power level.
2. Unit A has sent at least one EPN message to Unit B that indicates this current value.
3. Unit B is at least occasionally making received signal quality measurements (SQM).
4. Based upon its received EPN message and its determination of SQM, Unit B may decide:
    a) the current SQM is acceptable, and that no further action is required, or
    b) The current SQM is not acceptable.
5. In the case of 4b, Unit B then sends at least one EPR message via the reverse channel to Unit A.

6. Unit A receives this EPR message and recovers the power level value implied by the message.
7. Unit A then both:
   a) Adjusts its transmit power level to this value, and
   b) At least once sends this value back to Unit B in the form of an EPN message.

This operation is the result of a suitable incorporation of both EPR and EPN into the same closed loop, with the value for EPR being formulated by a number of suitable explicit power calculations. Details regarding one example of a suitable explicit power calculation is provided later in this specification.

The following describes the above operation (steps 1–7) in more detail, illustrating the benefits of this implementation of the invention. It is noted that these steps form a set of closed cyclic operations, as steps (7a) and (7b) are re-executions of steps (1) and (2), respectively. It is also noted that when the radio propagation conditions of the forward channel are stable, step (4a) is stable in that there is a cycle of operation of:

Steps . . . 3, 4, 4a, 3, . . . (Sequence 1)

The choice of whether to send EPR messages for repetitions of this sequence is optional, and may depend on the desired degree of fault-tolerance desired for the system. Should the propagation condition of the forward path make a single change, such as an abrupt shadowing event, so as to make a significant change in the determination of SQM, then the calculation of the EPR can be such that the following sequence occurs:

Steps . . . 3, 4, 4b, 5, 6, 7, 3, 4, 4a, 3, 4, 4a, 3, . . . (Sequence 2)

It is observed that the propagation event is fully corrected in just a single correction cycle, after which Sequence 2 reverts to Sequence 1. Should the propagation condition of the forward path make continuous changes, as might be incurred by a vehicular unit, Sequence 3 could result:

Steps . . . 3, 4, 4b, 5, 6, 7, 3, 4, 4b, 5, 6, 7, . . . (Sequence 3)

This sequence repeats until such time that the propagation conditions stabilize, and then the control automatically reverts to Sequence 1. The EPN message also provides for an implicit message acknowledgment scheme for the EPR messages, eliminating the need to incorporate additional mechanisms for the purpose.

An alternative embodiment of this invention is for Unit B to send some suitable combination of SQM and received EPN to Unit A. A process associated with the receive section at Unit A can use this combination to then formulate the EPR command and issue it to the transmit function of Unit A. A preferred, but not required, alternative is to send a multiplicity of the EPN and EPR messages, possibly at selected times. This operation is of significant benefit for situations where messages might get corrupted or lost. This operation is feasible because of the property of the EPR means that multiple EPR messages having the same value may be received without impacting the performance.

The above examples illustrate that the combined EPR/EPN means embodying of the present invention provides for superior power-control operation. The value for EPR is formulated by suitable calculations carried out by the microcontrollers 46, 72 shown in FIG. 5. A preferred method of calculating EPR is described below and referred to herein as an explicit power calculation (EPC).

The following description of the EPC assumes the combined EPR/EPN means, described above, or some other means similar to said combined means. This calculation method has a signal quality reference value (SQR), such that if SQM equals SQR to a sufficient degree of accuracy, then this calculation method will deem that no change in the transmitting units power is need to be made. Should an SQM not be sufficiently equal to the SQR, then a transmit power level correction (EPR) needs to be made, a revised value for EPR needs to be formulated, and at least one such EPR should be sent to the transmitting unit. A measure of the difference between SQM and SQR is then used to correct EPN to obtain the EPR.

A preferred embodiment of the above-referenced formulation is given by the following description. Assume a measurement and/or message period, j, has just concluded. A power control end (e.g. Unit B) has a reference value (SQR) in mind for the SQM. Thus, any difference between these two values represents an error. A "delta" power correction is indicated as follows:

$$PCI_j = \text{FUNCTION1}(SQR, SQM_j) \quad (1)$$

where FUNCTION1 is an algorithm that produces the amount of power correction that is required as a function of the measured signal quality and the desired signal quality, and $PCI_j$ is the power correction indication. The implementation of FUNCTION1 is specific to the nature of the technique used to obtain SQM, and many such techniques are known in the relevant art. The formulation means is not dependent on the nature of FUNCTION1, only that it exists. A simplified form of equation (1) may be employed when the SQM metric is linear with signal quality changes. This formulation is given by $$PCI_j = SQR - SQM_j \quad (2)$$

where the terms of equation (2) and the equations that follow may be expressed in terms convenient for the design, such as power units or in logarithmic terms, such as the commonly used decibel (dB). As an alternative, it may be desired to implement a control policy, such as a fast attack, that does not employ unity gain corrections. Thus, in general terms, a power correction value may be calculated as:

$$PCV_j = \text{GAIN}(PCI_j, \ldots) \quad (3)$$

where GAIN is predominately a function of $PCI_j$, but may also be a function of other considerations, and $PCV_j$ is power correction value. For a unity gain system, $PCV_j = PCI_j$.

The new desired transmit level is given by:

$$EPR_j = EPN_j + PCV_j = EPN_j + \text{GAIN}(\text{FUNCTION1}(SQR, SQM_j), \ldots) \quad (4)$$

For a unity gain system that employs a linearized SQM mechanism, equation (4) reduces to that represented by equation (5)

$$EPR_j = EPN_j + SQR - SQM_j \quad (5)$$

This EPR value will generally be sent to the other end in the next available message interval. It is observed that this use of EPR provides an ideal closed-loop response for power control in that the observed impairment is exactly corrected in the minimum possible time (a single RTT) without incurring overshoot or undershoot. Also, stable performance is obtained that is independent of and does not require knowledge of the RTT of the control loop. Traditional techniques, not employing EPR, require some knowledge of RTT to be stable, take several RTT's to stabilize to an initial disturbance, will have undershoot at the first RTT, and may have overshoot during subsequent RTT's.

These equations (1–5) represent a preferred embodiment, but may be readily modified to encompass some additional purpose or another. The key elements are the use of the EPN or similar means, the use of an SQM of some suitable means, the use, either explicit or implicit, of an SQR in order to obtain an EPR, or means similar to the EPR.

FIG. 4 illustrates how this invention applies to situations where the radio channel is bidirectional and power control is desired in both directions of the channel. These are designated as the forward and the return channels. For this messaging scheme, both the EPR command and the EPN message, or similar such means, are combined and placed into each end of the power control loop, as with Unit A and Unit B of FIG. 4. The power control message means has two fields: Explicit Power Request (EPR), which is the aforementioned EPR request (command) to the opposite end for it to transmit at the power level designated by the EPR message; and Explicit Power Notification (EPN), which is the aforementioned EPN that provides a notification from the opposite end that it is now sending at the power level designated by the EPN message. These fields may be coded as appropriate to the specific radio application at hand, using any of many well-known means. These fields may be, but are not necessarily, contiguous within the overall message (or frame), and may be placed in either order. These fields may be also applied to a message period and/or measurement period.

Of course, it should be understood that a range of changes and modifications can be made to the preferred embodiment described above. For example, the calculations of equations 1 through 5, or similar such calculations, may be performed with implementation of one or more microprocessors, DSPs or ASICs. It is therefore intended that the foregoing detailed description be regarded as illustrative rather than limiting and that it be understood that it is the following claims, including all equivalents, which are intended to define the scope of this invention.

What is claimed is:

1. A power control system for controlling transmission power over, communications channels, the system comprising:
   a first unit having a transmitter, a receiver and a power controller that controls the transmit power of said first unit transmitter;
   a second unit having a transmitter, a receiver, and means for substantially continuously determining the received signal power needs of the second unit receiver;
   a forward communications channel between said first unit transmitter and said second unit receiver;
   a reverse communications channel between said second unit transmitter and said first unit receiver; and
   means for substantially continuously generating reverse channel explicit-power-request commands based on said determination of the received signal power needs of the second unit receiver, said reverse channel explicit-power-request commands representing an absolute power level at which the first unit transmitter should transmit signals over said forward communications channel, wherein said reversed channel explicit-power-request commands communicate said absolute power level in a manner that is substantially independent of the power level at which the first unit transmitter had previously been transmitting with;
   said second unit transmitter receiving said reverse channel explicit-power-request commands and transmitting said explicit-power-request commands over said reverse communications channel.

2. The system of claim 1 wherein said determination of the received signal power needs of the second unit receiver is based on an acceptable received signal quality level for said second unit receiver.

3. The system of claim 1 wherein:
   said first unit comprises a radiotelephone; and
   said second unit comprises a gateway.

4. The system of claim 1 wherein said forward channel and said reverse channel pass through an intervening unit.

5. The system of claim 4 wherein said intervening unit comprises a satellite.

6. The system of claim 4 wherein said intervening unit comprises a gateway.

7. The system of claim 1 further comprising:
   said second unit comprising a second power controller that controls the transmit power of the second unit transmitter;
   said first unit further comprising means for determining the received power needs of the first unit receiver;
   means for generating a forward channel explicit-power-request command based on said determination of the received signal power needs of the first unit receiver, said forward channel explicit-power-request command representing an absolute power level at which the second unit transmitter should transmit signals over said reverse communications channel;
   said first unit transmitter receiving said forward channel explicit-power-request and transmitting said forward channel explicit-power-request over said forward communications channel.

8. The system of claim 7 wherein:
   said first power controller comprises a first digital to analog converter that drives a first voltage variable attenuator in said first unit transmitter;
   said second power controller comprises a second digital to analog converter that drives a second voltage variable attenuator in said second unit transmitter;
   said means for determining the received signal power needs of the second unit receiver comprises a second DSP;
   said means for determining the received signal power needs of the first unit receiver comprises a first DSP;
   said means for generating a reverse channel explicit-power-request command based on said determination of the received signal power needs of the second unit receiver comprises a second micro-controller; and
   said means for generating a forward channel explicit-power-request command based on said determination of the received power needs of the first unit receiver comprises a first micro-controller.

9. The system of claim 1 further comprising:
   said first unit comprising means for determining the transmitted signal power from said first unit transmitter;
   means for generating a forward channel explicit-power-notification message based on said determination of the transmitted signal power from said first unit transmitter, said forward channel explicit-power-notification message representing an absolute power level at which the first unit transmitter is transmitting signals over said forward communications channel;
   said first unit transmitter receiving said forward channel explicit-power-notification message and transmitting said forward channel explicit-power-notification message request over said forward communications channel.

10. The system of claim 9 wherein said determination of the received signal power needs of the second unit receiver is based on said forward channel explicit-power-notification message and a signal quality measurement.

11. The system of claim 9 wherein said determination of the received power needs of the second unit receiver is formulated in terms of an explicit-power-notification value based upon said forward channel explicit-power-notification message and a signal quality measurement, said explicit-power-notification value being converted into said reverse channel explicit-power-notification command.

12. The system of claim 9 further comprising:
said second unit comprising means for determining the transmitted signal power from said second transmitter;
means for generating a reverse channel explicit-power-notification message based on said determination of the transmitted signal power from said second unit transmitter, said reverse channel explicit-power-notification message representing an absolute power level at which the second unit transmitter is transmitting signals over said reverse communications channel;
said second unit transmitter receiving said reverse channel explicit-power-notification message and transmitting said reverse channel explicit-power-notification message request over said reverse communications channel.

13. The system of claim 12 wherein said determination of the received signal power needs of the first unit receiver is based on said reverse channel explicit-power-notification message and a signal-quality-measurement.

14. The system of claim 12 wherein said determination of the received signal power needs of the first unit receiver is formulated in terms of an explicit-power-notification value based on said reverse channel explicit-power-notification message and a signal quality measurement, said explicit-power-notification value being converted into said reverse channel explicit-power-notification.

15. A power control system for controlling transmission power over communications channels, the system comprising:
a first unit having a transmitter, a receiver and means for determining the transmitted signal power from said first unit transmitter;
a second unit having a transmitter and a receiver;
a forward communications channel between said first unit transmitter and said second unit receiver;
a reverse communications channel between said second unit transmitter and said first unit receiver; and
means for generating a forward channel explicit-power-notification message based on said determination of the transmitted signal power from said first unit transmitter, said forward channel explicit-power-notification message representing an absolute power level at which the first unit transmitter is transmitting signals over said forward communications channel;
said first unit transmitter receiving said forward channel explicit-power-notification message and transmitting said forward channel explicit-power-notification message request over said forward communications channel.

16. The system of claim 15 further comprising:
said second unit comprising means for determining the transmitted signal power from said second unit transmitter;
means for generating a reverse channel explicit-power-notification message based on said determination of the transmitted signal power from said second unit transmitter, said reverse channel explicit-power-notification message representing an absolute power level at which the second unit transmitter is transmitting signals over said reverse communications channel;
said second unit transmitter receiving said reverse channel explicit-power-notification message and transmitting said reverse channel explicit-power-notification message request over said reverse communications channel.

17. A method of controlling transmission power over communications channels in a communications system having a first unit comprising a transmitter and a receiver, a second unit comprising a transmitter and a receiver, a forward communications channel between said first unit transmitter and said second unit receiver, and a reverse communications channel between said second unit transmitter and said first unit receiver, the steps comprising;
determining the received signal power needs of the second unit receiver; generating a reverse channel explicit-power-request command based on said determination of the received signal power needs of the second unit receiver, said reverse channel explicit-power-request command representing an absolute power level at which the first unit transmitter should transmit signals over said forward communications channel, wherein said reverse channel explicit-power-request command communicates said absolute power level in a manner that is independent of the power level at which the first unit transmitter had previously been transmitting with; and
transmitting said explicit-power-request over said reverse communications channel.

18. The method of claim 17 wherein said determination of the received signal power needs of the second unit receiver is based on an acceptable received signal quality level for said second unit receiver.

19. The method of claim 17 wherein:
said first unit comprises a radiotelephone; and
said second unit comprises a gateway.

20. The method of claim 17 wherein said forward channel and said reverse channel pass through an intervening unit.

21. The method of claim 20 wherein said intervening unit comprises a satellite.

22. The method of claim 20 wherein said intervening unit comprises a gateway.

23. The method of claim 17 further comprising:
determining the received power needs of the first unit receiver;
generating a forward channel explicit-power-request command based on said determination of the received signal power needs of the first unit receiver, said forward channel explicit-power-request command representing an absolute power level at which the second unit transmitter should transmit signals over said reverse communications channel;
transmitting said forward channel explicit-power-request over said forward communications channel.

24. The method of claim 17 further comprising:
determining the transmitted signal power from said first unit transmitter;
generating a forward channel explicit-power-notification message based on said determination of the transmitted signal power from said first unit transmitter, said forward channel explicit-power-notification message representing an absolute power level at which the first unit transmitter is transmitting signals over said forward communications channel;

transmitting said forward channel explicit-power-notification message request over said forward communications channel.

25. The method of claim 24 wherein said determination of the received signal power needs of the second unit receiver is based on said forward channel explicit-power-notification message and a signal quality measurement.

26. The system of claim 24 wherein said determination of the received power needs of the second unit receiver is formulated in terms of an explicit-power-notification value based upon said forward channel explicit-power-notification message and a signal quality measurement, said explicit-power-notification value being converted into said reverse channel explicit-power-notification command.

27. The method of claim 23 further comprising:

determining the transmitted signal power from said second unit transmitter;

generating a reverse channel explicit-power-notification message based on said determination of the transmitted signal power from said second unit transmitter, said reverse channel explicit-power-notification message representing an absolute power level at which the second unit transmitter is transmitting signals over said reverse communications channel;

transmitting said reverse channel explicit-power-notification message request over said reverse communications channel.

28. The method of claim 27 wherein said determination of the received signal power needs of the first unit receiver is based on said reverse channel explicit-power-notification message and a signal-quality-measurement.

29. The system of claim 27 wherein said determination of the received power needs of the first unit receiver is formulated in terms of an explicit-power-notification value based upon said reverse channel explicit-power-notification message and a signal quality measurement, said explicit-power-notification value being converted into said forward channel explicit-power-notification command.

30. A method of controlling transmission power over communications channels in a communications system having a first unit comprising a transmitter and a receiver, a second unit comprising a transmitter and a receiver, a forward communications channel between said first unit transmitter and said second unit receiver, and a reverse communications channel between said second unit transmitter and said first unit receiver, the steps comprising:

determining the transmitted signal power from said first unit transmitter;

generating a forward channel explicit-power-notification message representing an absolute power level at which the first unit transmitter is transmitting signals over said forward communications channel;

transmitting said forward channel explicit-power-notification message request over said forward communications channel.

31. The method of claim 30 further comprising:

determining the transmitted signal power from said second unit transmitter;

generating a reverse channel explicit-power-notification message based on said determination of the transmitted signal power from said second unit transmitter, said reverse channel explicit-power-notification message representing an absolute power level at which the second unit transmitter is transmitting signals over said reverse communications channel;

transmitting said reverse channel explicit-power-notification message request over said reverse communications channel.

* * * * *